United States Patent Office 3,209,021
Patented Sept. 28, 1965

3,209,021
PROCESS FOR PREPARING ORGANO-PHOSPHATE ESTERS
Robert S. Mitchell, Webster Groves, Mo., and David H. Chadwick, New Martinsville, W. Va., assignors to Monsanto Company, a corporation of Delaware
No Drawing. Filed June 13, 1962, Ser. No. 202,060
19 Claims. (Cl. 260—461)

This invention relates to a novel process for producing organo-phosphate esters. More particularly, this invention is concerned with a process comprising the catalyzed reaction of phosphorus oxychloride and cyclic secondary alcohols.

Generally, in the absence of a catalyst, the reaction between a cyclic secondary alcohol and a phosphorus oxyhalide does not proceed satisfactorily beyond a mole to mole basis. Lengthy reaction times with the use of excessive amounts of alcohol are usually required to complete the reaction. Such a method is furthermore found objectionable because of the undesirable resultant low yields. Additionally, aliphatic secondary alcohols, cyclic secondary alcohols having less than 6 carbon atoms and cyclohexanols substituted in the 1, 2 and 6 positions yield essentially no neutral ester when reacted with a phosphorus oxyhalide in the presence of a catalyst. Unexpectedly, however, it has been found that a neutral ester, in substantial yield, is obtained when cyclohexanol and substituted cyclohexanols of the type hereinafter described are reacted with a phosphorus oxyhalide in the presence of a catalyst.

It is therefore a primary object of this invention to provide a novel catalytic process for the preparation of organo-phosphorus esters. More specifically, it is an object of this invention to provide a novel process for the preparation of certain tricyclohexyl phosphates.

These and still other objects, features, and advantages will become apparent from the following detailed description.

In accordance with this invention a phosphorus oxyhalide is reacted with a cyclic secondary alcohol in the presence of a catalyst selected from the group consisting of titanium halides, organic titanate compounds of the formula Ti(OR)$_4$ wherein R is selected from the group consisting of alkyl of from 1 to 18 carbon atoms, phenyl, and phenyl containing from 1 to 3 alkyl substitutents each containing from 1 to 4 carbon atoms, vanadium halides, vanadium oxides, vanadates and vanadyl halides. The reaction proceeds smoothly over a substantial temperature range while the catalyst displays no tendency to interfere.

Among the phosphorus oxyhalides useful as starting materials in this process are phosphorus oxychloride and phosphorus oxybromide; the mixed oxyhalides such as phosphorus oxydibromide chloride and phosphorus oxydichloride bromide.

The cyclic secondary alcohols useful in the process of this invention include cyclohexanol and substituted cyclohexanols containing from 1 to 3 alkyl substituents, each alkyl substituent having 1 to 12 carbon atoms. The substituents on the cyclohexanols are separated from the carbon atom containing the hydroxyl group by at least one unsubstituted carbon atom of the cyclohexane ring. Illustrative, but not limitative, of the substituted cyclohexanols which may be employed are 3-methylcyclohexanol, 3-butylcyclohexanol, 4-butylcyclohexanol, 3-ethylcyclohexanol, 3,3-dimethylcyclohexanol, 3-isopropylcyclohexanol, 4-isopropylcyclohexanol, 4-n-propylcyclohexanol, 4-butylcyclohexanol, 4-butylcyclohexanol, 3-hexylcyclohexanol, 4 - hexylcyclohexanol, 3 - octylcyclohexanol, 4-octylcyclohexanol, 3-nonylcyclohexanol, 4-nonylcyclohexanol, 3-dodecylcyclohexanol, 4-dodecylcyclohexanol, 3,3,5-trimethylcyclohexanol and the like.

The titanium halide catalyst which can be used in the process of this invention include any of the titanium halide salts such as the tetra-, tri and dichloride salts and the corresponding bromide, fluoride and iodide salts.

The organic titanate compounds which are useful in the process of this invention to catalyze the reaction may be represented by the formula Ti(OR)$_4$ wherein R is selected from the group consisting of alkyl of 1 to 18 carbon atoms, phenyl and alkylated phenyl having up to 3 alkyl substituents, each of said substituents being of 1 to 4 carbon atoms. Illustrative of such organic titanate compounds are tetramethyl titanate, tetraethyl titanate, tetraisopropyl titanate, tetrabutyl titanate, tetraisobutyl titanate, tetrapentyl titanate, tetraisopentyl titanate, tetrahexyl titanate, tetraisohexyl titanate, tetraheptyl titanate, tetraoctyl titanate, tetra(2-ethylhexyl) titanate, tetraisooctyl titanate, tetranonyl titanate, tetraisononyl titanate, tetradecyl titanate, tetraisodecyl titanate, tetradodecyl titanate, tetra(2-butyloctyl) titanate, tetratridecyl titanate, tetratetradecyl titanate, tetratetradecyl titanate, tetrapentadecyl titanate, tetrastearyl titanate, tetraphenyl titanate, tetracresyl titanate, tetra(o-ethylphenyl) titanate, tetra(m - ethylphenyl) titanate, tetra(p - ethylphenyl) titanate, tetra(2-n-propylphenyl) titanate, tetra(3-n-propylphenyl) titanate, tetra(4-n-propylphenyl) titanate, tetra(2-n-isopropylphenyl) titanate, tetra(3 - n - isopropylphenyl) titanate, tetra(4-n-isopropylphenyl) titanate, tetra(2-n-butylphenyl) titanate, tetra(3 - n - butylphenyl) titanate, tetra(4-n-butylphenyl) titanate, tetra(4-tert.-butylphenyl) titanate, tetra(diisobutylphenyl) titanate, tetra(2,3-dimethylphenyl) titanate, tetra(3,4-dimethylphenyl) titanate, tetra(2,4-dimethylphenyl) titanate, tetra(3,5-dimethylphenyl) titanate, tetra(3,4-dimethylphenyl) titanate, tetra(3-methyl-6-isopropylphenyl) titanate, tetra(3-methyl-5-isopropylphenyl) titanate, tetra(3-methyl-4-isopropylphenyl) titanate, tetra(2-methyl-4-isopropylphenyl) titanate, tetra(2-methyl-5-isopropylphenyl) titanate, tetra-(5-methyl-2-isopropylphenyl) titanate, tetra(2-methyl-4-n-butylphenyl) titanate, tetra(3 - methyl-6-n-butylphenyl) titanate, tetra(4-methyl-6-n- butylphenyl) titanate, tetra-(3-methyl-6-tert.-butylphenyl) titanate, tetra(4-methyl-6-tert.-butylphenyl) titanate, tetra(2,4,5 - trimethylphenyl) titanate, tetra(2,3,5-trimethylphenyl) titanate, tetra(3,4,5-trimethylphenyl titanate, tetra(2,3,4-trimethylphenyl) titanate, and the like.

Representative of the vanadium compounds which may be employed herein are vanadium tribromide, vanadium dichloride, vanadium trichloride, vanadium tetrachloride, vanadium trifluoride, vanadium tetrafluoride, vanadium pentafluoride, vanadyl monobromide, vanadyl dibromide, vanadyl tribromide, vanadyl chloride, vanadyl dichloride, vanadyl trichloride, vanadyl difluoride, vanadyl trifluoride, ammonium metavanadate, calcium metavanadate, copper metavanadate, potassium metavanadate, silver metavanadate, sodium orthovanadate, barium pyrovanadate, lithium metavanadate, vanadium dioxide, vanadium trioxide, vanadium tetraoxide, and vanadium pentoxide. As employed in this application, the terms "vanadium compound" and "compound of vanadium" refer not only to individual compounds themselves but also to mixtures of two or more of such compounds.

The reaction of the process of this invention proceeds according to the following equation which illustrates typical starting materials

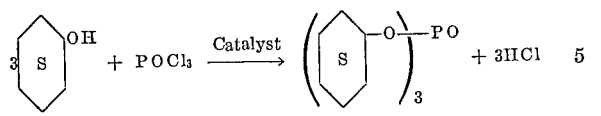

The amount of alcohol employed may be in substantial excess of the quantity which would be required by theory to insure that all of the halogen substituents connected to the phosphorus will react. Such excess can comprise from about 5% up to as much as 50% of the theoretical amount. However, it should be pointed out that the reaction will proceed in the presence of the stoichiometric quantity of alcohol.

The catalyst used in the process of this invention is found to be suitable over a fairly wide range of quantities. It has been determined that as little as 0.005% by weight of the catalyst based upon the weight of the cyclic secondary alcohol will serve to insure reaction. The upper percentage limit of catalyst will primarily depend upon practical and economic considerations, amounts up to at least 10% having been found suitable. For most reactions, it is preferred to employ a catalyst concentration of from about 0.5% to about 3% by weight based upon the weight of the starting cyclic secondary alcohol.

Both the technical grade and commercially pure grade of the catalytic material work equally well.

In practicing the process of this invention the alcohol and catalyst are placed in a suitable reactor, and the phosphorus oxyhalide is added. Those skilled in the art will recognize that the process is not limited to specific reaction temperatures, since the reaction can be carried out at temperatures of from about 0° C. to temperatures of about 150° C. The preferred temperature range varies from about 5 to 95° C. Upon completion of the reaction the desired phosphorus product is recovered by methods well known to those skilled in the art. For example, the reaction mixture is successively washed with acid, water and aqueous sodium carbonate, steam sparged and finally dried to yield the phosphorus product.

The invention will be more fully understood by reference to the following examples. Such examples, however, are given for the purpose of illustration only and are not to be construed as limiting the scope of the present invention in any way.

*Example I*

A suitable reactor is charged with 165.7 grams (1.65 moles) of cyclohexanol. A charge of 76.7 grams (0.5 mole) of phosphorus oxychloride is added over a period of about 1 hour while the temperature is maintained at about 20° C. The pressure is then reduced to 11 mm. Hg, and the reaction mixture is heated to about 70° C. to insure completion of the reaction. The resultant mixture is washed several times with water and finally with aqueous sodium carbonate. Essentially no product is found to be isolatable.

*Example II*

A suitable reactor is charged with 141.9 grams (1.65 moles) of cyclopentanol followed by 2.8 grams titanium tetrachloride. Phosphorus oxychloride in the amount of 76.7 grams (0.5 mole) is added over a period of about 1 hour. The mixture is maintained at 12–15° C. during the addition of the phosphorus oxychloride. The pressure is reduced to 18 mm. Hg, and the reaction mixture is heated to about 70° C. to insure completion of the reaction. The resultant reaction mixture is then washed several times with water and finally with aqueous sodium carbonate. No product is found to be isolatable.

*Example III*

A suitable reactor is charged with 188.4 grams (1.65 moles) of 2-methylcyclohexanol followed by 3.8 grams of titanium tetrachloride. Phosphorus oxychloride in the amount of 76.7 grams (0.5 mole) is added over a period of about ½ hour while the temperature is maintained at 9–15° C. The reaction mixture is worked up in the manner defined in Example I. No product is found to be isolatable.

*Example IV*

A suitable reactor is charged with 214.8 grams (1.65 moles) of 2-octanol followed by 6.6 grams titanium tetrachloride. Phosphorus oxychloride in the amount of 76.7 grams (0.5 mole) is added over a period of about 1 hour while the temperature is maintained at 8–10° C. The reaction mixture is worked up in the manner defined in Example I. No product is found to be isolatable.

*Example V*

A suitable reactor is charged with 165.7 grams (1.65 moles) of cyclohexanol followed by 3.3 grams of titanium tetrachloride. There is then added 76.7 grams (0.5 mole) of phosphorus oxychloride over a period of about 1 hour. The mixture is maintained at 18–20° C. during the addition of the phosphorus oxychloride. The pressure is then reduced to 12 mm. Hg, and the reaction mixture is heated to about 70° C. to insure completion of the reaction. The resultant reaction mixture is then successively washed with an acid wash and several times with water and aqueous sodium carbonate. Said mixture is dehydrated under vacuum. There is obtained 133.0 grams (77.2% of theory) of tricyclohexyl phosphate, m.p. 62.8–64.2° C.

*Example VI*

A suitable reactor is charged with 661.6 grams (6.6 moles) of cyclohexanol followed by 19.8 grams of titanium tetrachloride. There is then added 306.8 grams (2.0 moles) of phosphorus oxychloride over a period of about 2 hours. The mixture is maintained at 10–20° C. during the addition of the phosphorus oxychloride. The pressure is then reduced to 10 mm. Hg, and the reaction mixture is heated to 70° C. to insure completion of the reaction. The resultant reaction mixture is then successively washed with several acid washes, several times with water and finally with aqueous sodium carbonate. Said mixture is steam sparged under vacuum, dehydrated and filtered. There is obtained 508.4 grams (73.7% of theory) of tricyclohexyl phosphate.

*Example VII*

A suitable reactor is charged with 188.4 grams (1.65 moles) of 3-methylcyclohexanol followed by 4.6 grams titanium tetrachloride. There is then added 76.7 grams (0.5 mole) of phosphorus oxychloride over a period of about 1 hour. The mixture is maintained at 7–14° C. during the addition of the phosphorus oxychloride. The pressure is then reduced to 11 mm. Hg, and the reaction mixture is heated to about 70° C. to insure completion of the reaction. The resultant reaction mixture is then successively washed with an acid wash, several times with water and finally with aqueous sodium carbonate. The reaction mixture is steam sparged, dehydrated and filtered. There is obtained 167.4 grams (86.6% of theory) of tri-(3-methylcyclohexyl)phosphate.

*Example VIII*

A suitable reactor is charged with 188.4 grams (1.65 moles) of 4-methylcyclohexanol followed by 3.8 grams of titanium tetrachloride. There is then added 76.7 grams (0.5 mole) of phosphorus oxychloride over a period of about 1 hour. The mixture is maintained at 10–14° C. during the addition of the phosphorus oxychloride. The pressure is then reduced to 24 mm. Hg, and the reaction mixture is heated to about 95° C. to insure completion of the reaction. This requires a time of about 2 hours. The resultant reaction mixture is successively washed with several acid washes, several times with water and finally with aqueous sodium carbonate. The reaction mixture is then steam sparged under vacuum and dehydrated. There is obtained 126.3 grams (65.3% of theory) of tri-(4-methylcyclohexyl)phosphate.

*Example IX*

A suitable reactor is charged with 165.7 grams (1.65 moles) of cyclohexanol, followed by 3.3 grams of ammonium metavanadate. Phosphorus oxychloride in the amount of 76.7 grams (0.5 mole) is added over a period of about 1 hour. The mixture is maintained at 12–20° C. during the addition of the phosphorus oxychloride. The pressure is reduced to 14 mm. Hg, and the reaction mixture is heated to about 70° C. to insure completion of the reaction. The resultant reaction mixture is then successively washed with an acid wash, several times with water and finally with aqueous sodium carbonate. The reaction mixture is dehydrated under vacuum and filtered. There is obtained 108.6 grams (63.0% of theory) of tricyclohexyl phosphate.

*Example X*

Following the procedure of Example V, 165.3 grams (1.65 moles) of cyclohexanol, 3.3 grams of vanadium tetrachloride and 76.7 grams (0.5 mole) of phosphorus oxychloride are utilized to prepare tricyclohexyl phosphate in good yield.

*Example XI*

A suitable reactor is charged with 165.7 grams (1.65 moles) of cyclohexanol and 3.3 grams tetrabutyl titanate. 76.7 grams (0.5 mole) of phosphorus oxychloride is added over a period of about 1 hour while the temperature is maintained at about 12–20° C. The reaction mixture is then worked up in the manner of the preceding examples to give tricyclohexyl phosphate in good yield.

*Example XII*

Following the procedure of Example V, 165.3 grams (1.65 moles) of cyclohexanol, 3.3 grams of vanadium tetraoxide and 76.7 grams (0.5 mole) of phosphorus oxychloride are used to prepare tricyclohexyl phosphate in excellent yield.

*Example XIII*

A suitable reactor is charged with 188.4 grams (1.65 moles) of 4-methylcyclohexanol and 3.8 grams tetrabutyl titanate. Phosphorus oxychloride in the amount of 76.7 grams (0.5 mole) is added over a period of about ½ hour while the temperature is maintained at 10–14° C. The reaction mixture is worked up in the manner defined in Example V, and tri-(4-methylcyclohexyl)phosphate is obtained in good yield.

*Example XIV*

A suitable reactor is charged with 188.4 grams (1.65 moles) of 3-methylcyclohexanol and 3.8 grams tetrabutyl titanate. With the temperature held at about 9–14° C., there is added 76.7 grams (0.5 mole) of phosphorus oxychloride over a period of about ½ hour. The reaction mixture is worked up in the manner described in Example V, and an excellent yield of tri-(3-methylcyclohexyl)phosphate is obtained.

*Example XV*

A suitable reactor is charged with 165.7 grams (1.65 moles) of cyclohexanol and 3.3 grams tetrabutyl titanate. 143.5 grams (0.5 mole) of phosphorus oxybromide is added over a period of about 1 hour while the temperature is maintained at about 12–20° C. The reaction mixture is then worked up in the manner of the preceding examples to give tricyclohexyl phosphate in excellent yield.

*Example XVI*

Following the procedure of Example V, 165.3 grams (1.65 moles) of cyclohexanol, 6.3 grams tetrastearyl titanate, and 76.7 grams (0.5 mole) of phosphorus oxychloride are utilized to prepare tricyclohexyl phosphate in good yield.

*Example XVII*

Following the procedure of Example V, 165.3 grams (1.65 moles) of cyclohexanol, 8.7 grams tetraphenyl titanate, and 76.7 grams (0.5 mole) phosphorus oxychloride are utilized to prepare tricyclohexyl phosphate in excellent yield.

*Example XVIII*

Following the procedure of Example V, 188.4 grams (1.65 moles) of 3-methylcyclohexanol, 2.1 grams tetramethyl titanate, and 76.7 grams (0.5 mole) of phosphorus oxychloride are utilized to prepare tri-(3-methylcyclohexyl)phosphate.

*Example XIX*

Following the procedure of Example V, 188.4 grams (1.65 moles) of 4-methylcyclohexanol, 5.3 grams titanium trichloride, and 76.7 grams (0.5 mole) of phosphorus oxychloride are utilized to prepare tri-(4-methylcyclohexyl)phosphate in good yield.

*Example XX*

Following the procedure of Example V, 165.7 grams (1.65 moles) cyclohexanol, 3.3 grams tetra(2-ethylhexyl) titanate, and 76.5 grams (0.5 mole) of phosphorus oxychloride are utilized to prepare tricyclohexyl phosphate in good yield.

*Example XXI*

Following the procedure set forth in Example V, 165.3 grams (1.65 moles) of cyclohexanol, 3.39 grams of vanadium trichloride and 76.7 grams (0.5 mole) of phosphorus oxychloride are utilized to prepare tricyclohexyl phosphate.

From these exemplary preparations, it will be seen that this invention provides a simple method for the preparation of phosphate esters from cyclic secondary alcohols. The reaction conditions are mild and a pure product is recovered with comparative ease.

While this invention has been described with respect to certain embodiments, it is not so limited, and it is to be understood that variations and modifications thereof may be made which are obvious to those skilled in the art without departing from the spirit or scope of this invention.

The embodiments of the invention in which an exclusive property or privilege is claimed are defined as follows:

1. A process for preparing a triorgano-phosphate which comprises reacting a cyclic secondary alcohol selected from the group consisting of cyclohexanol and substituted cyclohexanols having from 1 to 3 alkyl substituents having from 1 to 12 carbon atoms, said substituents being separated from the carbon atoms containing the hydroxyl group by at least one unsubstituted carbon atom of the cyclohexane ring, with a phosphorus oxyhalide in the presence of a compound selected from the group consisting of titanium halides, organic titanate compounds of the formula

$$Ti(OR)_4$$

wherein R is selected from the group consisting of alkyl of from 1 to 18 carbon atoms, phenyl, and phenyl containing from 1 to 3 alkyl substituents each containing from 1 to 4 carbon atoms, vanadium halides, vanadium oxides, vanadates and vanadyl halides.

2. A process of claim 1 wherein the reaction temperature is from about 0 to 150° C.

3. A process of claim 1 wherein the reaction temperature is from about 5 to 95° C.

4. A process of claim 1 wherein the concentration of catalyst is from about 0.005 to 10% by weight based upon the weight of the cyclic secondary alcohol.

5. A process of claim 1 wherein the concentration of catalyst is from about 0.5 to 3.0% by weight based upon the weight of cyclic secondary alcohol.

6. A process in accordance with claim 1 wherein the compound is titanium tetrachloride.

7. A process in accordance with claim 1 wherein the compound is tetrabutyl titanate.

8. A process in accordance with claim 1 wherein the compound is ammonium metavanadate.

9. A process for preparing a triorgano-phosphate which comprises reacting cyclohexanol, with a phosphorus oxyhalide in the presence of a compound selected from the group consisting of titanium halides, organic titanate compounds of the formula $$Ti(OR)_4$$

wherein R is selected from the group consisting of alkyl of from 1 to 18 carbon atoms, phenyl, and phenyl containing from 1 to 3 alkyl substituents each containing from 1 to 4 carbon atoms, vanadium halides, vanadium oxides, vanadates and vanadyl halides.

10. A process of claim 9 wherein the reaction temperature is from 0 to 150° C., and the catalyst concentration is from about 0.005 to about 10% by weight based upon the weight of the cyclohexanol.

11. A process of claim 9 wherein the reaction temperature is from about 5 to 95° C., and the catalyst concentration is from about 0.5 to about 3.0% by weight based upon the weight of the cyclohexanol.

12. A process of claim 9 wherein the halogenated phosphorus compound is phosphorus oxychloride.

13. A process for preparing a triorgano-phosphate which comprises reacting a substituted cyclohexanol containing from 1 to 3 alkyl substituents having 1 to 12 carbon atoms, said substituents being separated from the carbon atom containing the hydroxyl group by at least 1 unsubstituted carbon atom of the cyclohexane ring, with a phophorus oxyhalide in the presence of a compound selected from the group consisting of titanium halides, organic titanate compounds of the formula $$Ti(OR)_4$$

wherein R is selected from the group consisting of alkyl of from 1 to 18 carbon atoms, phenyl, and phenyl containing from 1 to 3 alkyl substituents each containing from 1 to 4 carbon atoms, vanadium halides, vanadium oxides, vanadates and vanadyl halides.

14. A process of claim 13 wherein the reaction temperature is from about 0 to 150° C., and the catalyst concentration is from about 0.005 to about 10% by weight based upon the weight of the substituted cyclohexanol.

15. A process of claim 13 wherein the reaction temperature is from about 5 to 95° C., and the catalyst concentration is from about 0.5 to about 3.0% by weight based upon the weight of the substituted cyclohexanol.

16. A process of claim 13 wherein the substituted cyclohexanol is 3-methylcyclohexanol.

17. A process of claim 16 wherein the reaction temperature is from about 5 to 95° C., and the catalyst concentration is from about 0.5 to about 3.0% by weight based upon the weight of the 3-methylcyclohexanol.

18. A process of claim 13 wherein the substituted cyclohexanol is 4-methylcyclohexanol.

19. A process of claim 18 wherein the reaction temperature is from about 5 to 95° C., and the catalyst concentration is from about 0.5 to about 3.0% by weight based upon the weight of the 4-methylcyclohexanol.

References Cited by the Examiner

UNITED STATES PATENTS 2,624,750  1/53  Pechukas _____ 260—461
2,868,827  1/59  O'Connor et al. _____ 260—461

CHARLES B. PARKER, *Primary Examiner.*

MORRIS LIEBMAN, IRVING MARCUS, *Examiners.*